Patented July 2, 1946

2,403,200

UNITED STATES PATENT OFFICE 2,403,200

AIRCRAFT FUEL TANK LINING

Frederick T. Weiss, Normandy, Mo., and William A. Sullivan, Edwardsville, Ill., assignors to Shell Development Company, San Francisco, Calif., a corporation of Delaware No Drawing. Application June 8, 1942, Serial No. 446,296

4 Claims. (Cl. 154—43.5)

The present invention relates to aircraft fuel tank liners and particularly to aircraft fuel tank liners of the puncture proof type which are utilized in military aircraft.

Self-sealing liners for military aircraft fuel tanks recently have come into common use. These liners are usually formed of a layer of natural rubber sandwiched between two layers of fabric, the inner layer at least being formed of a hydrocarbon resistant material, one of the numerous synthetic rubber compounds being generally used for this purpose. The self-sealing action of these liners is dependent upon the swelling action of the natural rubber layer which takes place when the inner layer of the liner is ruptured, permitting the hydrocarbon fuel to come in contact with the natural rubber layer. It has also recently been found advantageous to incorporate certain aromatic type hydrocarbons, such as benzene, toluene, xylene, ethyl benzene, etc. in aviation fuels, particularly in those fuels which are to be used in supercharged engines. However, none of the commonly known and easily available synthetic rubber compounds which would otherwise be suitable for such use is sufficiently resistant to the action of aromatic hydrocarbons for use in fuel tank liners which are to be in contact with fuels containing appreciable amounts of aromatic components.

It is an object of the present invention to provide a method for treating certain types of synthetic rubber compounds to render them impermeable to the action of aromatic hydrocarbons. Another object is to provide a treated material which is substantially unaffected by the action of aromatic hydrocarbons and at the same time retains its normal physical characteristics. A more specific object is to provide a synthetic rubber material which is particularly adapted for use as the inner element of fuel tank liners that are to be used in contact with aromatic hydrocarbons. Still another object is to provide a method for treating certain types of fuel tank liners which are normally unsuitable for use in contact with aromatic hydrocarbons in order to render them substantially impervious to the action of fuels containing substantial amounts of aromatic hydrocarbons.

Other objects, together with some of the advantages to be derived from utilizing the present invention, will become apparent from the following detailed description thereof.

Broadly, according to the present invention, the above objects may be attained by the surface halogenation of certain types of synthetic rubber compounds. Specifically, these objects may be attained by surface halogenation of copolymers of butadiene and its homologues with other unsaturated reactive compounds which will copolymerize to produce a rubber-like material. For purposes of the present specification the term "other unsaturated reactive compounds" is defined to mean olefins, vinyl compounds, unsaturated aldehydes, ketones and ethers, polymers of acetylene hydrocarbons and their derivatives, derivatives of butadiene, etc. Specific examples of such compounds which are commonly used for copolymerization with butadiene and its homologues are, for example, styrene, acrylonitrile, butylene, chloroprene, isobutene, vinyl chloride, vinyl esters, acrylic acid, methacrylic acid, acrolein, methyl isopropenyl ketone, vinyl ethyl ether, mono and di-vinyl acetylene polymers.

Examples of specific commercially produced synthetic rubber compounds, prepared by copolymerization of materials such as are outlined above and which are susceptible to treatment according to the present invention, are as follows: Ameripol (butadiene-acrylonitrile), Buna S (butadiene-styrene), and Perbunan (butadiene-acrylonitrile).

It has long been known that halogenation of rubber yields a product which is even more readily soluble in aromatic hydrocarbons than the unhalogenated material (see, for example, U. S. Patent 1,544,534). It has now been found, however, that synthetic rubbers of the type defined above have greatly improved resistance to aromatic hydrocarbons after halogenation, contrary to expectations.

For the purposes of the present invention, i. e. preparation of a material suitable for use as an aircraft fuel tank liner and analogous uses such as hose pipe linings, gaskets, storage tank liners, etc., it has been found both satisfactory and preferable to halogenate only the surface of the material to be impermeabilized to the action of aromatic hydrocarbons. In this manner substantial modification of the desirable inherent physical characteristics of the synthetic rubber, such as tensile strength, elasticity, resistance to oxidation and sunlight, etc., may be avoided.

The surface halogenation of the synthetic rubber may be carried out in divers ways, such as for example exposing sheets of the same to an atmosphere of chlorine or bromine vapors or exposing the surface of the rubber sheets to the action of a halogen in a water solution or an acidified solution of alkali metal hypochlorites in water. Other liquids in which halogens are dissolved, such as carbon tetrachloride, may also be utilized. However, for practical purposes, in consideration of its availability and ease of application, suspension of the material to be treated in an atmosphere of chlorine is recommended as the preferred method of treatment. The conditions necessary for satisfactory treatment of synthetic rubber according to the present invention will be found to vary with the particular material which is to be impermeabilized. The necessary treating conditions may be easily determined for any suitable material by following the procedure outlined below. In the examples cited below a copolymer of butadiene and acrylonitrile having a relatively high content of the latter and marketed under the trade name of Ameripol was utilized as the test material. Satisfactory results are obtained in surface-halogenating both unvulcanized synthetic rubber and material which has been vulcanized and/or compounded with carbon and the like.

In order to determine the diffusion rate of aromatic hydrocarbons through the test material, the test method described in U. S. Air Corps Specification No. 16112-A for Gasoline-Resistant Synthetic Rubber Fabric was followed. A blend containing 50% toluene and the remainder paraffinic hydrocarbons boiling in the gasoline range was used as the test fuel. All of the tests were conducted at a temperature of 75±1° F. and at atmospheric pressure. The butadiene copolymer was in sheet form supported on cotton fabric. Exposures were made as noted below and the indicated results obtained.

| Test No. | Treatment | Fuel loss by diffusion per 24 hours (in grams) |
|---|---|---|
| 1 | Untreated | 0.719 |
| 2 | Cl₂ gas—1 side—10 minutes | 0.161 |
| 3 | Cl₂ gas—1 side—20 minutes | 0.040 |
| 4 | Cl₂ gas—1 side—40 minutes | 0.024 |
| 5 | Cl₂ gas—2 sides—20 minutes | 0.020 |
| 6 | Br₂ gas—1 side—2 minutes | 0.296 |
| 7 | Br₂ gas—1 side—5 minutes | 0.160 |
| 8 | Cl₂ gas in CCl₄ (sat'd)—1 side—20 minutes. | 0.248 |
| 9 | Br₂ gas in CCl₄ (3% by vol.)—1 side—5 minutes. | 0.260 |

The rate of diffusion of the fuel through the fabric in the above test did not increase, even after nine weeks contact.

The rate of diffusion through a given material after a given treatment will be found to vary with the aromatic content of the test fuel. For this reason, it is necessary to determine empirically for each type of synthetic rubber and each type of fuel the optimum surface halogenation that should be carried out to attain the desired degree of impermeability.

It has been found advantageous to follow the surface halogenation with a neutralizing treatment or other treatment to remove excess halogens which may remain in the synthetic rubber. Water washing or blowing with air for a reasonable period of time will be found satisfactory for this purpose. More rapid elimination of excess halogens may be attained by rinsing the surface of the treated material with a sodium thiosulfate solution followed by a water wash or by rinsing with an aqueous solution of sodium carbonate or other neutralizing agent.

In the manufacture of fuel tank liners according to the present invention the synthetic rubber material may be surface halogenated prior to forming the same into fuel tank cells, or, alternatively, the cells after fabrication may be treated by filling the same with the treating agent, preferably chlorine vapor, and permitting them to stand for a predetermined period of time, determined experimentally as outlined above. In such cases, air blowing will usually be found to be the most expedient method of removing the excess halogen from the cells after the treatment has been completed. Fuel tank liners treated according to the present invention will be found to resist the action of aromatic hydrocarbons for a period at least as long as their normal useful life.

We claim as our invention:

1. A fuel tank containing a flexible liner having an innermost layer in contact with aromatic hydrocarbons, said innermost layer having improved resistance to penetration by said aromatic hydrocarbons and consisting of a synthetic rubber product of polymerization of butadiene with an unsaturated reactive compound selected from the group consisting of acrylonitrile and styrene, said synthetic rubber product having its surface only halogenated to a degree insufficient to substantially modify the normal physical characteristics thereof.

2. A fuel tank containing a flexible liner having an innermost layer in contact with aromatic hydrocarbons, said innermost layer having improved resistance to penetration by said aromatic hydrocarbons and consisting of a synthetic rubber product of polymerization of butadiene with acrylonitrile, said synthetic rubber product having its surface only halogenated to a degree insufficient to substantially modify the normal physical characteristics thereof.

3. A fuel tank containing a flexible liner having an innermost layer in contact with aromatic hydrocarbons, said innermost layer having improved resistance to penetration by said aromatic hydrocarbons and consisting of a synthetic rubber product of polymerization of butadiene with styrene, said synthetic rubber product having its surface only halogenated to a degree insufficient to substantially modify the normal physical characteristics thereof.

4. A fuel tank containing a flexible liner having an innermost layer in contact with aromatic hydrocarbons, said innermost layer having improved resistance to penetration by said aromatic hydrocarbons and consisting of a synthetic rubber product of polymerization of butadiene with an unsaturated reactive compound selected from the group consisting of acrylonitrile and styrene, said synthetic rubber product having its surface only chlorinated to a degree insufficient to substantially modify the normal physical characteristics thereof.

FREDERICK T. WEISS.
WILLIAM A. SULLIVAN.